United States Patent [19]

Ott et al.

[11] Patent Number: 5,754,674
[45] Date of Patent: May 19, 1998

[54] DOCUMENT IMAGE ANALYSIS METHOD

[75] Inventors: David Michael Ott; Cynthia Diane Ott, both of Oakland, Calif.

[73] Assignee: BancTec, Inc., Dallas, Tex.

[21] Appl. No.: 788,430

[22] Filed: Jan. 28, 1997

Related U.S. Application Data

[62] Division of Ser. No. 351,630, Dec. 8, 1994, Pat. No. 5,600,732.

[51] Int. Cl.⁶ ..................................................... G06K 9/00
[52] U.S. Cl. ........................... 382/112; 382/137; 382/286
[58] Field of Search ..................................... 382/112, 137, 382/138, 139, 140, 227, 286, 291, 292, 318, 319

[56] References Cited

U.S. PATENT DOCUMENTS

| | | | |
|---|---|---|---|
| 4,183,013 | 1/1980 | Agrawala et al. | 382/173 |
| 4,584,703 | 4/1986 | Hallberg | 382/140 |
| 4,710,963 | 12/1987 | Chapman et al. | 382/112 |
| 5,058,182 | 10/1991 | Kuan et al. | 382/202 |
| 5,065,437 | 11/1991 | Bloomberg | 382/176 |
| 5,142,589 | 8/1992 | Lougheed et al. | 382/102 |
| 5,191,612 | 3/1993 | Katsuyama et al. | 382/171 |
| 5,235,652 | 8/1993 | Nally | 382/112 |
| 5,239,592 | 8/1993 | Kameyama | 382/138 |
| 5,253,304 | 10/1993 | LeCun et al. | 382/102 |
| 5,289,122 | 2/1994 | Shigeno | 324/252 |
| 5,650,799 | 7/1997 | Melen | 358/468 |

FOREIGN PATENT DOCUMENTS

WO92/06447  4/1992  WIPO.

Primary Examiner—Leo Boudreau
Assistant Examiner—Phuoc Tran
Attorney, Agent, or Firm—Akin, Gump, Strauss, Hauer & Feld, L.L.P.

[57] ABSTRACT

Digital images of documents such as bank checks are analyzed to determine acceptable image quality by capturing an image at a first or normal sensitivity and at a second or greater sensitivity. Both sets of image signals are subjected to speckle filtering to remove extraneous image elements or noise. The greater sensitivity signals are grouped in discrete areas having a predetermined number of pixels and black pixels which are connected are identified as an object in each discrete area. Each object is analyzed by measuring height, width, area, perimeter, aspect ratio, density ratio and perimeter to area ratio. Predetermined limits for these characteristics are applied to each object to classify the object as stroke-like or of another shape. Stroke-like objects are then compared with the object at the same position in the normal image field and a so-called area ratio of the number of black pixels in the normal image to the number of black pixels in the more intense image is determined. Stroke images having less than a minimum value of area ratio are subjected to a normal image missing pixel count and the image is deemed acceptable or unacceptable if a predetermined number of pixels are missing in the normal image. The method may be applied selectively to high rate document image capture and recording systems for verification of image quality and the health of the recording system.

11 Claims, 2 Drawing Sheets

DOCUMENT IMAGE ANALYSIS METHOD

This is a division of application Ser. No. 08/351,630, filed Dec. 8, 1994, now U.S. Pat. No. 5,600,732.

FIELD OF THE INVENTION

The present invention pertains to a method for analyzing recorded images of documents, such as bank checks, to determine image legibility. The method may be used, in particular, for quality assurance of images being captured by an image recording system in a large-scale document processing operation.

BACKGROUND OF THE INVENTION

There are many document processing operations wherein an image of each document is required for data processing or for archival purposes. In processing bank checks through the commercial banking system, for example, it is desirable to digitally record images of bank checks for data processing and for archival purposes. Moreover, it is also desirable to verify the quality of the captured image before the check leaves the possession of the image recording entity. In this way, documents which were not properly imaged may be re-recorded before being destroyed or otherwise taken out of possession of the entity requiring the image.

Documents such as bank checks and similar instruments present certain problems in maintaining image legibility due to the presence of hand-written information on the document as well as obliteration of data by background patterns and pictorial printing, contrast and poor quality printing. The long, stroke-like images created by hand-written or hand-printed information, as well as typewritten information, including images of arabic numerals, English letters and signatures, may have varying intensity depending on the writing instrument, the penmanship of the person entering the information on the document or the type of printing apparatus, in the case of machine printed information. Accordingly, analysis of these stroke-like images is deemed a critical image feature to be considered when verifying image quality or legibility.

Another problem associated with capturing legible images of documents such as bank checks pertains to the elements of the image which are created by pictorial backgrounds on the face of the check and the color of the check paper. Moreover, there has heretofore been a tradeoff in setting the threshold sensitivity of document scanning devices because too high a sensitivity results in undesired low contrast features being recorded as part of the image. For example, features such as smudges, background patterns, dropout inks, printing on the other side of the document, or even the paper fibers themselves may be included in the captured image and interfere with reading the desired information. These extraneous features ("noise") also increase the file size for the image and increase the amount of information storage required by digital recording and storage equipment, thereby increasing image transmission time over data networks, for example. Of course, if the scanning device is set to capture an image at a lower sensitivity threshold, this increases the risk of not capturing important hand and typewritten information if such is of lower contrast than might be anticipated. Thus, the optimum normal sensitivity image is one wherein the captured image includes as much of the desired information as possible with little or no extraneous information or "noise".

Although prior efforts have been made to measure image quality by analysis of the entire document or preselected areas of the document, these efforts have been limited to measuring global properties of the image, such as identifying the existence of a totally black or totally white image, which analysis would indicate a failure of the processing equipment. Moreover, the use of histograms reflecting the distribution of the total number of black pixels across a document can also be a quality indicator but the acceptability criteria is based on predetermined averages of pixel distribution. Another technique which has been used is based on counting the total number of small features on a document to indicate the existence of a "high noise level" or by analyzing the compressed image size to indicate a noisy image or an image with excessive pixel dropout. These prior efforts at image analysis are based on predetermined acceptable limits for the global parameters above mentioned and do not consider the localized content of information on a particular document. Accordingly, such techniques do not work well with documents that have a wide variety of image pixel content and have important information in certain specific regions of the image such as, for example, bank checks and similar financial instruments. Another example of the limitations of the above-mentioned global techniques would be in imaging certain types of forms which normally have a great deal of image content even if the form is blank or not filled in with the full amount of information. Accordingly, the global techniques have difficulty in discriminating a blank form from one that has information filled in. Accordingly, the present invention addresses the need to analyze the quality of a captured image of a particular document being scanned and the acceptability of information defects in the image is based on localized analysis of critical elements in the image.

Accordingly, there has been a continuing need to verify image quality and legibility for documents which are being electronically scanned for image capture and storage so that an inferior image may be identified in a timely manner to allow intervention and re-recording of the image while the document is still available for doing so. The present invention contemplates a unique method for verifying image quality and acceptability for electronically-recorded images of the types of documents discussed in detail herein. However, those skilled in the art will appreciate that the method may be used in connection with verification of image quality for other types of documents or for recorded images of other objects.

SUMMARY OF THE INVENTION

The present invention provides a unique method for verifying image legibility for digitally captured images of documents and the like. The invention provides a method for identifying critical image elements such as stroke-like features which appear on documents, including such elements as hand-written or machine printed numerals, letters, words and signatures. The present invention is particularly useful for verifying image quality and legibility for digitally recorded images of financial instruments such as bank checks, tax forms and similar documents.

In accordance with one important aspect of the invention, an image of a document is recorded in digital form at a first or so-called normal level of sensitivity of an image capturing and processing system. The so-called "normal" level of sensitivity is chosen in accordance with the tradeoff of capturing desired information with a minimum of capture of undesired images. The image is simultaneously captured at a higher level of sensitivity by the image capturing and processing system and this higher level of sensitivity image will capture low contrast information features that would not be recorded at the normal sensitivity threshold. Of course, the higher sensitivity images may also acquire some undesired image features or "noise". Both image signals are then subjected to certain filtering processes to eliminate extraneous image elements and the image recorded at the higher sensitivity signal is then subjected to a process for identifying stroke-like elements in the image, which elements are then compared to corresponding elements in the image captured at the lower or normal level of sensitivity to determine if the same elements recorded at the normal level of sensitivity are sufficiently legible to comprise an acceptable image.

In accordance with another important aspect of the present invention, a document image is recorded digitally by creating a predetermined field of discrete picture elements or pixels which each have an assigned black or white value and an assigned position or address in the field. The image field may then be subjected to a method of subdividing the entire image into discrete areas of a grid-like pattern wherein each discrete area is labeled with its position in the field and the image within each area is then scanned to identify pixels which have either an image value, a black pixel, or a background value, a white pixel.

The above-mentioned subdivision process will prevent multiple characters that intersect a single feature (such as an underline) from being grouped together into an object that is much larger than its constituent characters. Moreover, the subdivision of the image into discrete areas also allows long words that are hand written in cursive style to be broken up so that they can be treated with the same measurement parameters as shorter words. The discrete areas are determined such as to be larger than the size of a typical word character while smaller than a long word thus reducing the breaking up of individual strokes while also reducing the undesired merging of unrelated features.

All black pixels which are connected to another black pixel within each area are then identified collectively and classified as an object. Each object is then assigned an identifier and stored in an object table. Additional parameters regarding each object are then calculated including length, width, perimeter, area density, and the ratio of perimeter to area. The perimeter to area ratio of each object is an important feature of the method of the invention in that this parameter is used to identify the object as being stroke-like in shape or having another shape which may be less important to establishing image legibility. Character strokes with a uniform stroke width have both their area and their perimeter approximately proportional to the total stroke length while other features (such as noise "dots") that are not long and narrow have a larger total number of pixels compared to their perimeter. For example, a round dot has the largest area for a given perimeter and a thin line has the smallest area for a given perimeter.

In accordance with yet a further aspect of the present invention, an image recording and analysis method is provided wherein previously identified components of an image which have certain shape characteristics are further designated by the desired feature sought, such as stroke-like images, for example. Discrete areas which include image elements which are classified as stroke images, for example, are then combined with one or more adjacent discrete areas which include stroke-like image elements and these combined areas or "tiles" are compared with the same combination of discrete areas or tiles in the image which was captured at the normal sensitivity level. In many instances, the deletion of several character strokes in a single word or number is a more severe legibility problem than the deletion of strokes in isolated characters in different portions of the image. Many words may be read by human beings that are missing a single character, but the legibility is severely impacted if most of the characters in a word are missing. Thus, combining adjacent areas into word sized groups allows different values of legibility thresholds to be used for such documents. If the normal image has a sufficient number of black pixels, as compared with the more sensitive image element which was subjected to the aforementioned processing steps, the document being analyzed is identified as having an acceptable image or not.

The present invention further contemplates the provision of a unique method for measuring image quality of digitally recorded images of documents such as bank checks, which comprise one of the most difficult documents to record legibly by electronic image capturing systems. The invention contemplates that the method may be carried out with programmable electronic digital computation apparatus which is configured for general purpose applications. Thus the method may be carried out by programming the apparatus to perform certain steps. Alternatively, the apparatus may be adapted for dedicated operation as an image-capturing, analysis and storage system. Such a dedicated implementation may include specific purpose digital electronic apparatus components which are operable to achieve high rates of information transmission, manipulation and storage in a cost effective manner. Those skilled in the art will further appreciate the above-mentioned features and advantages of the invention together with other superior aspects thereof upon reading the detailed description which follows in conjunction with the drawing.

DESCRIPTION OF A PREFERRED EMBODIMENT

Figure 1:
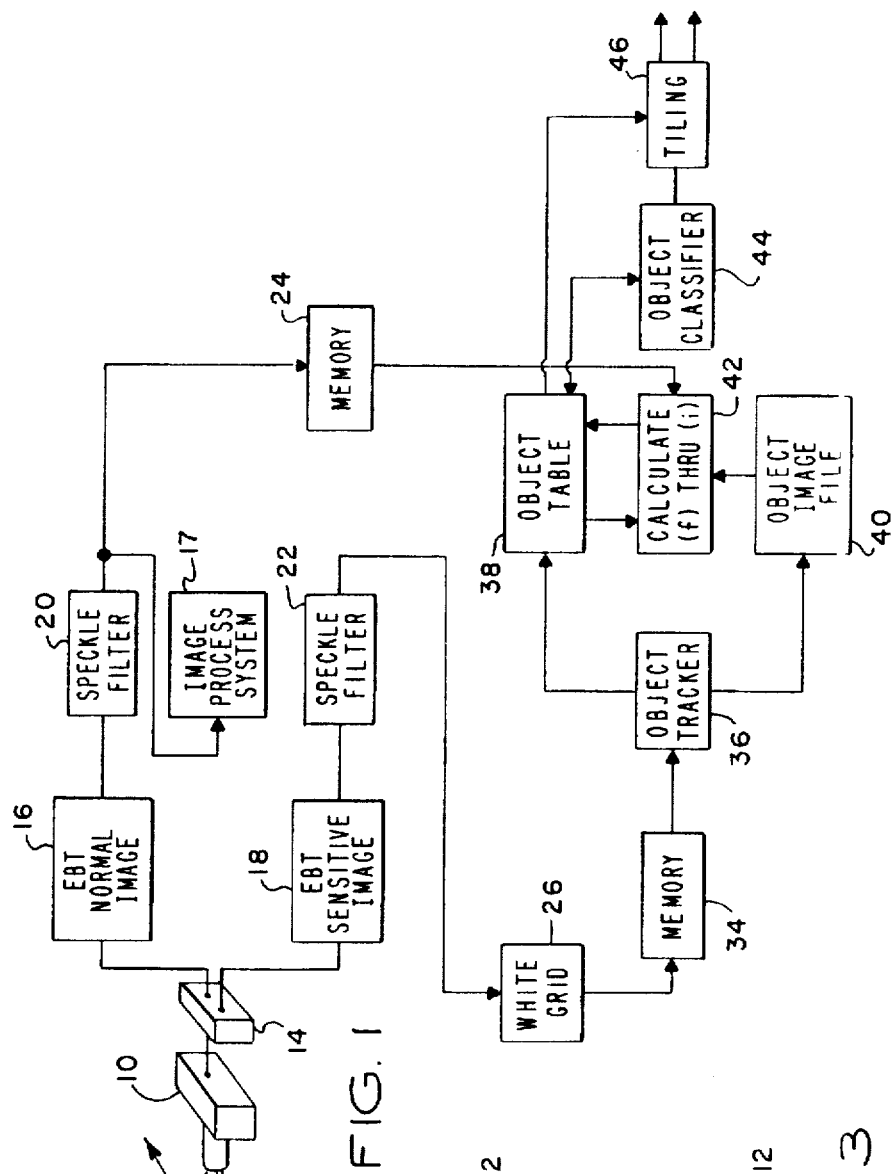
FIG. 1 is a schematic diagram illustrating certain steps in the method of the present invention.

In the description which follows like elements are marked throughout the specification and drawing with the same reference numerals, respectively. The drawing figures are not necessarily to scale in the interest of clarity and conciseness.

As mentioned previously, the present invention is particularly useful in verifying the acceptability of an image of a document such as a bank check and similar instruments which have hand written or machine printed characters thereon. Commercially available check document processing equipment is capable of processing documents for information recordation and sorting at a rate of from about six hundred to two thousand five hundred documents per minute, such as, for example, the model 5500 reader/sorter manufactured by the assignee of the present invention. Accordingly, apparatus has also been developed which is capable of recording a visual image of each document at these same rates of document handling, such as the above-mentioned apparatus.

FIG. 1 illustrates a conventional electronic image acquisition device or camera 10 which is part of the above-mentioned commercial apparatus and is operable to electronically capture an image of the front face of a check document 12. Alternatively, the device 10 may be one of a type available from Dalsa, Ltd., Waterloo, Canada as their model CL-C3-1024. The system and method of the invention may also be used, of course, to capture images of the opposite side of the document 12, if desired. The image acquisition device 10 is operably connected to an image processor 14 which may include suitable circuitry which serves to digitize the captured image, that is to transform an analog signal from the acquisition device 10 into a plurality of digital words, each word representing the intensity of the image in a finite area picture element or pixel.

The processor 14, which is also part of the above-mentioned commercial apparatus, is operable to capture the digital image of the document 12 at a so-called "normal" sensitivity and to capture the same image at a more sensitive level. However, large scale recordation of the image at a more sensitive level may actually be more adverse to legibility of the image for readability, optical character reader recognition rates, storage or archival purposes than setting the image sensitivity at a lower or so-called normal level due, for example, to background information on the document such as check documents with artistic designs or printed on multi-colored paper. Accordingly, the image captured at a less sensitive contrast threshold level, as predetermined to be "normal", is desired for recording images of all documents passing the acquisition device 10.

The term "sensitivity" as used herein is taken in the sense that a higher level of sensitivity of an image would capture images of objects of relatively low contrast with the background of the image. Accordingly, a high sensitivity image would make objects captured appear darker and would capture objects of low contrast, including features on the image field which may not be desired to be recorded, such features are herein also referred to as noise. Thus, an image of low or normal sensitivity might be easier to read, but might also have eliminated therefrom certain features of the image which are desired to be recorded. For purposes of discussion herein, reference is made to a "normal" sensitivity image and to an image which is more sensitive or of "greater" sensitivity.

The invention contemplates that images may be recorded at more than two levels of sensitivity, for example up to as many as six levels of sensitivity, and the steps of the method may be carried out between any two levels of sensitivity or between, for example, the most sensitive level image and all of the lesser sensitive images. The apparatus described hereinabove may be adapted to capture images at the various levels of sensitivity discussed.

The image processor 14 may also be adapted to apply a so-called edge base threshold technique to assigning a "black" or "white" value to each pixel of a normal or more sensitive image. The edge based threshold (EBT) technique may be carried out by processing the digitized image data through a suitable processor of a type commercially available, such as a model VST-1000 thresholder circuit from Picture Elements Incorporated of Berkeley, Calif. Accordingly, the image processor 14 is operable to generate an image of the document 12 using the EBT technique to assign values of "black" or "white" to each pixel of the image at the normal image signal sensitivity, as indicated by block 16, and at a more sensitive signal level as indicated by block 18. Thus, a quantity of digital data representing black or white pixels is generated for the "normal" image 16 and a quantity of digital data representing black or white pixels is generated for the sensitive image 18. The use of terms "black" and "white" herein as describing pixel identity may be reversible, depending on the imaging device, or conversion of signals during processing. For purposes of discussion a black pixel represents information or an object in an image and a white pixel the absence of such.

All of the marking techniques commonly used for putting information on paper, including pencil, ink, printer toner and copier toner are operable to absorb light that would otherwise be reflected by the paper. Accordingly, the convention described herein with respect to the analysis of black pixels is appropriate for the types of documents intended to be processed by the method of the invention. The processing of the image data using the aforementioned EBT technique is advantageous and minimizes the problem of so-called width spreading of image features, such as hand-written strokes, at the sensitive image signal level.

Accordingly, for each document whose image is captured by the acquisition device 10, a set of digital signals representing a field of black and white pixels is generated for the entire document at each signal sensitivity level. In a preferred embodiment of the invention for analyzing the legibility of images of check documents, images are generated from a field of pixels at a resolution of 200 pixels per inch of document length and 200 pixels per inch of document width. Conventional bank check documents may have a length of 8.5 inches and a width of 3.66 inches, for example. Accordingly, a processed image of each document comprises slightly less than 1.25 million pixels.

As shown in FIG. 1, both the so-called normal image 16 and sensitive image 18, in digital form and made up of "black" or "white" pixels, are subjected, respectively, to "speckle" filter steps 20 and 22 to eliminate extraneous or spurious signals. A preferred speckle filter step 20 or 22 is carried out by eliminating from the digital data, for each image, all black pixels in a group of two by two, one by two (vertically stacked), which groups are surrounded by white pixels, two by one (horizontally stacked), or single pixels which are surrounded by white pixels, respectively. The degree of speckle filtering or "scrubbing" of the digital images may be modified for certain types of documents. However, any larger grouping of pixels, at the rate of pixels per inch described herein, may adversely affect the method of the invention as applied to bank check documents and the like.

Figure 2:
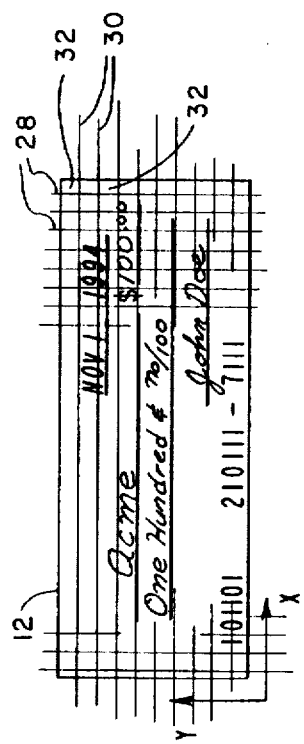
FIG. 2 is a plan view of a document showing representative grid lines used in defining the discrete areas in accordance with the invention.

The speckle filtering may be carried out by the aforementioned VST-1000 processor circuit. The normal image 16 is also processed by the user's document image processing system 17, preferably after speckle filtering. As shown in FIG. 1, the speckle filtered normal image may also then be placed in a suitable digital data memory 24 for further processing to be described herein. Each pixel placed in memory 24 has a particular coordinate address from an X-Y coordinate system, as indicated in FIG. 2, and each pixel of the sensitive image field is also assigned a coordinate address which corresponds to the address of the same pixel in the normal image field.

The sensitive image may then be subjected to subdivision into plural discrete areas in a step labeled in FIG. 1 by box 26 and also identified as the "white grid" step. The white grid process 26 is carried out by subdividing the image field into plural discrete areas having a predetermined number of pixels. For example, referring to FIGS. 2 and 3, an orthogonal grid represented by grid lines 28 and 30 may be established wherein discrete areas 32 are formed and each area 32 may have a predetermined number of pixels per side. A preferred size for each of the discrete areas 32 for a check document or the like is approximately sixty-four pixels in length by sixty-four pixels in width, which is approximately 0.32 inches by 0.32 inches, based on the 200 pixel per inch rate for the images captured by the acquisition device 10 and processed by the image processor 14. The above described size of the discrete areas is small enough to limit the connection of unrelated strokes with other features that the strokes may be touching, such as underlines, while being sufficiently large to minimize the chance of dividing a single character stroke into multiple small fragments. In certain applications of the method herein described, such as analyzing documents without underlines, the white grid step is neither necessary nor beneficial.

Figure 3:
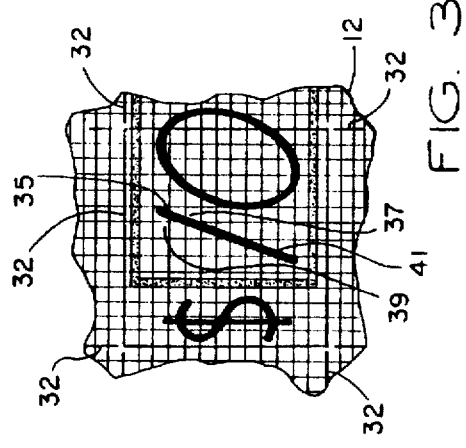
FIG. 3 is a detail showing one discrete area of the grid for the document shown in FIG. 2.

The discrete grid areas 32 are of a length and width such that a substantial portion of a hand written character on a check will appear within one area. Each area 32 may be represented by an array of exactly sixty-three pixels in length by sixty-three pixels in width or height if the grid lines 28 and 30 are set at a thickness or width of one pixel. Alternatively, a "virtual" grid may be established wherein none of the pixels in the image field are eliminated by the grid lines. However, for purposes of the method of the invention the elimination of a line only one pixel wide is indicated to not be detrimental to the image analysis method. FIG. 3 illustrates one of the discrete areas 32 in its entirety and also shows the adjacent discrete areas 32 partially. The particular discrete area 32 illustrated in FIG. 3 shows the space on the check document 12 wherein the hand written numerals for the amount of the check are entered. The detail view of FIG. 3 also shows the grid of individual pixels such as pixels 35, 37 and 39, for example, which define and are adjacent to a stroke-like element 41 indicating a hand-written numeral "1".

Referring again to FIG. 1, the data regarding the type of pixel (black or white) and the address of each discrete area 32 containing such pixels, from establishing the grid of discrete areas 32 in step 26, may then be stored in a suitable memory 34. Data may be taken from the memory 34 for each discrete area for further processing in a step identified as object tracker 36. Each discrete area 32 in the image field is scanned in the object tracker step 36 in a suitable manner, such as one row of pixels at a time, until a black "seed" pixel is identified and its address noted. The scanning procedure is then continued until all black pixels which are connected to the first mentioned or seed pixel are identified. Each group of connected black pixels is then identified as an object. Each object is given an identifying number and is given a suitable coordinate address in the image field, which is the address of its "seed" pixel. The identifying number, which may be referred to as the "object label", is used to produce a labeled object image to facilitate selective analysis of individual objects in the following steps. The preferred embodiment utilizes a sixteen bit label, allowing over sixty four thousand distinct objects to be present in the image. This information is stored in an object image file 40 and the addresses of the "seed" pixels are stored in the object table 38.

In processing a typical bank check image, the object table may contain several thousand objects, only a minority of which may constitute the objects that are necessary for the desired information in the check to be deemed legible. Moreover, those skilled in the art will recognize that there are two commonly used definitions for whether two pixels are "connected". There is the so-called four connected rule which requires that the pixels to be considered connected are of the same color along their common edge and the so-called eight connected rule which also includes same colored pixels which touch only at their corners. Either rule may be applied in accordance with the method of the invention with the eight connected rule being treated as a default mode.

In accordance with a further portion of the object identifier or "tracker" step 36, the following object shape feature measurements are made for each object identified:

(a) the X-Y coordinate location of the so-called seed pixel, (b) object height (topmost to bottommost pixel in the object), (c) object width (left most to right most pixel in the widest horizontal row of pixels in the object), (d) object area (total number of pixels in the object), and (e) object perimeter (total number of boundary pixels in the object). The number of pixels counted along a diagonal edge of an object can represent a contribution to the perimeter that is the square root of two greater than the pixels counted along a vertical or horizontal edge. In a preferred embodiment of the method, this square root of two correction may be included as an option in the method and is treated as a default mode of carrying out the method.

The pixels mentioned in measurements (a) through (e) are the black pixels. The measurements (a) through (e) for each identified object are also placed in the object table 38.

The measurements (b) through (e) for each object in the object table 38 are then used to make calculations in a calculation step 42 of each of the object shape feature parameters identified below as (f) through (i), which parameters are as follows:

(f) object aspect ratio (height/width), (g) object density ratio (area/(height times width)), (h) object perimeter to area ratio (perimeter/ area), and (i) object area ratio (normal image area divided by sensitive image area). For calculation (i) the normal image at the same address as the object identified in the sensitive image is measured to determine its area before calculation of the area ratio (i) is carried out.

The EBT sensitive image 18, as processed by the aforementioned step, is used for a so-called connected component analysis because this image contains the most information as well as the most "noise". The area ratio calculation (i) also makes use of the normal image to determine the percentage of black pixels in the sensitive image object being analyzed that have not dropped out in the corresponding locations in the normal image. This information is useful for determining the amount of pixel dropout within a stroke-like object. The aforementioned calculation steps are carried out in the above-mentioned process as indicated in block 42 of FIG. 1.

As shown in the diagram of FIG. 1, the area ratio calculation requires calling up the pixels (black or white) from the normal image as stored in memory 24 which have the same addresses as the black pixels which are part of an identified object. Moreover, the object table 38 is also adapted to contain the aforementioned measured and calculated parameters (a) through (i) for each object which has been identified during the object tracker step.

After each sensitive image object has been identified, given an address and characterized by the above-mentioned parameters, a further step in the method is carried out which is known as object classifier, as indicated by the block 44 in the diagram of FIG. 1. Object classification is carried out to determine if an object is a stroke-like object or an object which represents another portion of the image field. Predetermined object characteristics are compared to the measured and calculated characteristics (b) through (h) of each object to determine if it is stroke-like, including predetermined minimum and maximum object widths, heights, areas, aspect ratios, perimeters, density ratios, and, particularly perimeter to area ratios. If the object being tested fails any of the minimum or maximum tests, it is not considered to be a stroke-like object. Different object classifications may be performed according to the characteristics of the desired and undesired features of the document image being analyzed, utilizing various known characteristics of such documents. For example, on the front side of a bank check underlines are horizontal lines while in the endorsement area on the back of the check, the underlines are normally vertical lines. The parameters for determining object classification also depend on the scanning resolution, such as the 200 pixels per inch used for commercially available bank check scanners.

For example, in determining whether or not an object is stroke-like, it should have a height greater than five pixels, an area greater than 50 pixels, and a perimeter to area ratio greater than about 0.8. Objects represented on a bank check comprising horizontal underlines, for example, will have a height less than fifteen pixels and, an aspect ratio of less than 0.3. Other limits may, of course, be set depending on the type of document being processed in accordance with the method. Objects which have been taken from the object table 38 and subjected to object classification by the above-mentioned comparisons are identified as stroke-like or not and returned to the object table 38 with the proper identification.

One of the more important parameters for identifying a stroke-like object is the perimeter to area ratio. Since the perimeter to area ratio is determined to be the total number of boundary pixels divided by the total number of pixels in an object, it is noted that if, for example, the ratio of these numbers is about 0.8 or greater, and the object does not have the characteristics of a horizontal "underline", that this is rather convincing information that the object is "stroke-like".

Figure 4:
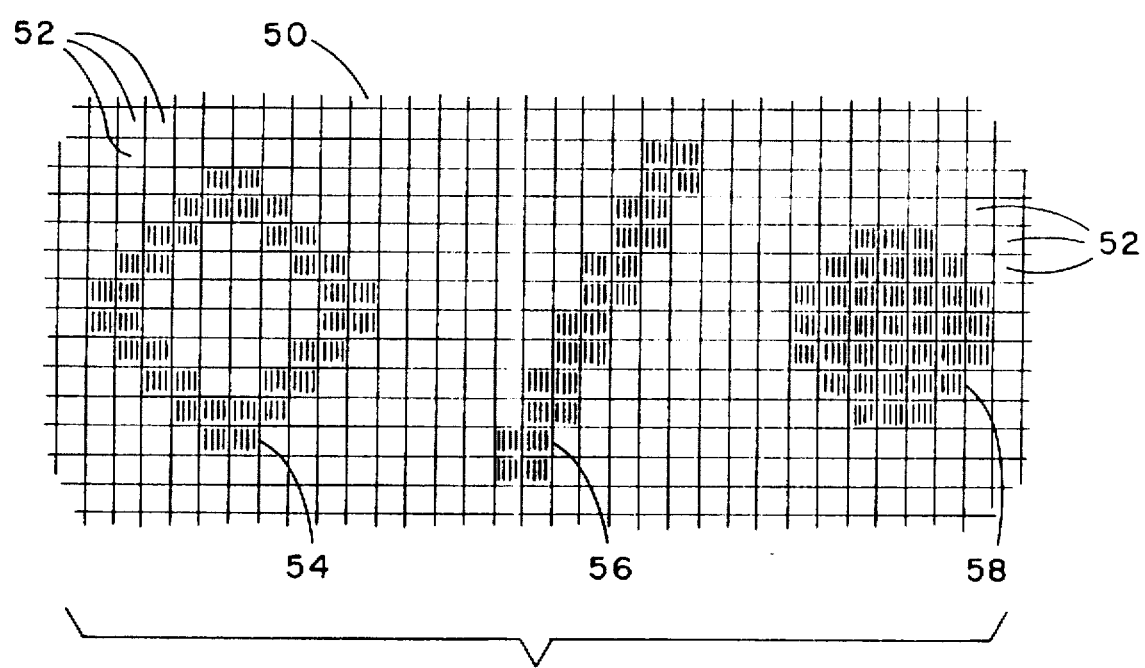
FIG. 4 is a diagram showing images of two stroke-like objects and one nonstroke-like object.

Referring to FIG. 4, there is shown a portion of a pixel grid 50 having individual pixels 52. An object 54 is illustrated which has a total perimeter of thirty six, that is the sum of all black boundary pixels. The object 54 also has a total area of thirty six, that is the total of all black pixels in the object. Accordingly, the object 54 has a perimeter to area ratio of 1.0 which indicates that it is a stroke-like object. FIG. 4 also illustrates an object 56 in the pixel grid 50 which has a total of twenty four boundary pixels giving it a perimeter value of twenty four. Object 54 has a total of twenty four black pixels giving it an area of twenty four. Accordingly, the object 56 also has a perimeter to area ratio of 1.0 indicating that it is stroke-like as illustrated.

FIG. 4 further illustrates an object 58 which is a nonstroke-like dot-shaped object having a perimeter of sixteen black pixels and an area of thirty seven black pixels giving it a perimeter to area ratio of 0.43, and decidedly nonstroke-like. Accordingly, it can be seen from FIG. 4 and the foregoing description that stroke-like characters have a greater perimeter to area ratio than so-called blob-like features. In general, for a constant stroke width, both the perimeter and the area of the object will increase together with a roughly constant proportion between them as the stroke length is increased. For example, a stroke that is about 0.01 inches wide (a two-pixel width when scanned at 200 pixels per inch resolution) would have roughly the same perimeter and area at this resolution. The perimeter will have approximately two pixels for each pixel in stroke length and the area will also have approximately two pixels for each pixel in stroke length.

Depending on the application of the method, features may be considered as desired features or undesired features. For instance, fine print may be considered a desired feature in some document scanning applications, but for forms processing applications where the fine print is printed in a dropout color of ink (typically to reduce the compressed image file size), it is not desirable to use a normal image sensitivity that is so sensitive that it picks up the dropout inks. Those skilled in the art will appreciate that the method described herein can be used to determine whether or not the fine print characters are being successfully dropped out of the image while the desired stroke-like information is being retained.

Discrete areas 32 which are identified as having stroke-like objects therein may then be combined with an adjacent discrete area 32 in a so-called "tiling" step indicated by block 46 in FIG. 1. If the method is applied to analyzing image quality for the front face image of a bank check, it is preferable to group two side-by-side (horizontal direction) discrete areas together to form tiles. In analyzing images on a conventional bank check, the size of the discrete areas 32 have been determined to be that which are likely to capture a significant portion of a hand-written or machine printed stroke and the combining of a discrete area 32 with an adjacent discrete area 32, either to the left or to the right in a horizontal direction, is also likely to capture a further portion of a hand-written or machine printed word. Accordingly, combining two adjacent discrete areas 32 to perform the tiling step is considered suitable for certain image quality analyses where the desired information consists of words or multi-digit numbers. The tiling step in the method is an optional step and may not be necessary or desirable for all types of image quality analysis.

A preferred "tiling" step is carried out by taking the stroke-like objects identified in a particular tile and analyzing those stroke-like objects which have an area ratio of 0.58 or less, for example. If the total number of black pixels in the stroke-like objects which have an area ratio of 0.58 or less in the normal sensitivity image is fewer than the corresponding number of black pixels in the objects in the sensitive image by a count of 100 or more, the tile is deemed to have an unacceptable amount of dropout in its stroke-like objects. If the dropped pixel count is between 50 and 99, the tile is deemed to be a marginal tile. If neither of these conditions is met, then the stroke-like objects in the normal sensitivity image include a sufficient number of black pixels to be automatically considered "good". If a document image as a whole has one or more unacceptable tiles or five or more marginal tiles, then it would be declared unacceptable. If a document image is not considered unacceptable, but it has three or more marginal tiles, then it would be declared "marginal" instead. If there are no unacceptable tiles and fewer than three marginal tiles, then the document image is accepted and declared as "good".

In some applications of the method, the normal image may not be retained and the primary benefit of the analysis will be its determination of the characteristics of the image being scanned. For example, the determination of whether an image has sufficient contrast for successful microfilm capture could use the method described herein, even though the primary goal is the production of high quality microfilm images. The ability of the method of the invention to identify the presence of desirable and undesirable features using a high sensitivity image (which provides a more complete representation of those features, allowing them to be more accurately classified) and then to use a normal sensitivity image to measure the sufficient presence of those features is thus an independently useful capability of this invention.

Grouping of stroke-like objects in other than the rectangular tile array described above may be appropriate for some documents. For instance, a primary marginal stroke may be analyzed to identify other or secondary marginal strokes in the immediate area (within 20 pixels of the primary stroke, for example), and accordingly the method may then analyze marginal strokes adjacent to those secondary strokes up to some limit of position from the original or primary stroke. The group may then be analyzed by summing the total pixel dropout count.

The criteria for labeling a document image as acceptable, questionable, or unacceptable may, of course, be preselected. The aforementioned description of a particular quantification of the method, is considered suitable for use of the aforementioned type of equipment for imaging bank checks and the like. The limits in the legibility analysis step described above may, of course, be adjusted as desired.

The above-described method is believed to be unique in that it contemplates the comparison of a so-called normal sensitivity digital image to a higher sensitivity digital image to evaluate the normal image quality. The method is also considered to be unique in provision of the steps of the identification of stroke-like features by the tests applied to the various image parameters described herein. Still further, the method of the invention is believed to be unique in that captured images of stroke-like elements at normal and higher threshold sensitivities are compared to determine the quality of the normal image. Furthermore, the step of grouping of stroke-like images based on measurements of small or discrete areas which are expected to approximate the area covering a hand-written or printed entry on a document is believed to be novel. This step is enhanced by the orientation of the tiles based on the expected axis of entry. In other words, hand-written entries on the front face of a bank check would extend generally horizontally while the entries on the back of a check would extend somewhat vertically, i.e., the direction of handwriting of the endorsement on the back of the check. Furthermore, the method contemplates the establishment of a grid of discrete areas to provide for more detailed analysis of relatively long strokes in an image and, lastly, the method is believed to be unique in the sense of providing a step to measure the dropout or absence of black pixels in predetermined discrete areas or tiles for evaluation of the overall health of an image of a document captured at a normal image threshold sensitivity level.

The above-mentioned method may be applied either to the entire document image or to selected regions in the image, or to multiple selected regions with different image acceptance criteria applied to each region. For example, a specific detection of stroke-like objects in the signature area of a bank check could be used to identify unsigned checks. Similarly, for forms processing applications, it may be of value to detect specific fields in the form that have not been filled out.

The above-mentioned method may also be applied to multiple normal sensitivity images, each with a slightly different sensitivity, to allow the optimum tradeoff between picking up low contrast information and undesired noise. The image which picks up a sufficient proportion of the strokes (deemed "marginal" or "good") and has the smallest number of noise-like objects has the highest image quality and can be the image that is saved by the imaging system. By using only one sensitive image, only one object tracker is required and only the stroke-like objects need to be compared in the various normal images, thus making the implementation of this method relatively efficient. Still further, the method contemplates that the determination of the area ratio of the image and the total dropped out pixel count as a measure of missing pixels may be modified by certain mathematical manipulations of the actual dropped pixel count including use of a logarithmic value corresponding to the actual pixel count, for example.

The above-mentioned method may be carried out on a system which would be made up of a combination of commercially available large scale integrated circuits suitably programmed to perform the steps described herein. Accordingly, a unique method for verifying the legibility of digitally recorded images of documents such as bank checks and the like has been described hereinabove.

Although a preferred embodiment of a method for analysis of document images has been described in some detail herein, those skilled in the art will recognize that various substitutions and modifications may be made without departing from the scope and spirit of the appended claims.

What is claimed is:

1. A method of analyzing an image of a document for determining the quality of said image comprising the steps of:

generating plural image fields comprising respective sets of pixels having a black or white character and representing respective multiple levels of sensitivity of said image;

generating an image field of a set of pixels having either a black or white character and representing a level of sensitivity of said image greater than the image fields of said multiple levels of sensitivity;

scanning pixels of said set representing said level of sensitivity greater than said image fields of said multiple levels of sensitivity to identify at least one object;

measuring at least one preselected parameter of said one object to identify a predetermined shape characteristic of said one object;

comparing a portion of said image field representing said level of sensitivity greater than said image fields of said multiple levels of sensitivity which includes said at least one object with corresponding portions of the image fields of said multiple levels of sensitivity; and identifying at least one of said image fields of said multiple levels of sensitivity as one of legible and illegible.

2. A method of analyzing an image of a document comprising the steps of:

generating an image field comprising a first set of adjacent pixels having either a black or white character and representing a normal level of sensitivity of said image;

generating an image field of a second set of adjacent pixels having either a black or white character and representing a greater level of sensitivity of said image;

subdividing said image field of said second set of pixels into a plurality of predetermined discrete areas;

scanning a selected one of said discrete areas to identify a black seed pixel;

scanning said one discrete area to identify all black pixels connected to said seed pixel directly or indirectly to identify at least one object in said one discrete area;

determining at least one of the parameters of height, width, perimeter, area, aspect ratio, density ratio and perimeter to area ratio of said object;

determining the ratio of the number of black pixels in a corresponding discrete area of said normal image to the number of black pixels in said object in said discrete area of said image of greater sensitivity;

classifying said object as stroke-like based on the value of at least one of said parameters;

counting the number of black pixels missing from said normal image of said object if the ratio of the number of black pixels in said normal image to the number of black pixels in said object in said image of greater sensitivity is less than a predetermined amount; and declaring the image within said discrete area as being acceptable or unacceptable based on the number of black pixels missing from said normal image.

3. The method set forth in claim 2 including the step of:
combining at least two discrete areas to form a tile;
comparing at least one tile having stroke-like objects identified therein with a corresponding tile of said normal image to determine the number of black pixels missing from said tile of said normal image.

4. The method set forth in claim 3 including the steps of:

declaring the normal image of said document as being acceptable, marginal or unacceptable based on the number of tiles which have a predetermined number of black pixels missing from the normal images of said tiles, respectively.

5. A method of analyzing an image of a document comprising the steps of:

generating an image field comprising a first set of adjacent pixels having either a black or white character and representing a normal level of sensitivity of said image;

generating an image field of a second set of adjacent pixels having either a black or white character and representing a greater level of sensitivity of said image;

subdividing said image field of said second set of pixels into a plurality of predetermined discrete areas;

scanning a selected one of said discrete areas to identify a black seed pixel;

scanning said one discrete area to identify all black pixels connected to said seed pixel directly or indirectly to identify at least one object in said one discrete area;

determining at least one of the parameters of height, width, perimeter, area, aspect ratio, density ratio, and perimeter to area ratio of said object;

determining the ratio of the number of black pixels of said object in a corresponding discrete area of said image field of normal sensitivity to the number of black pixels in said object in said one discrete area of said image field of greater level of sensitivity; and classifying said object based on the value of at least one of said parameters.

6. A method of analyzing an image of a document comprising the steps of:

generating an image field comprising a first set of adjacent pixels having either a black or white character and representing a normal level of sensitivity of said image;

generating an image field of a second set of adjacent pixels having either a black or white character and representing a greater level of sensitivity of said image;

subdividing said image field of said second set of pixels into a plurality of predetermined discrete areas;

scanning a selected one of said discrete areas to identify a black seed pixel;

scanning said one discrete area to identify all black pixels connected to said seed pixel directly or indirectly to identify at least one object in said one discrete area;

determining at least one of the parameters of height, width, perimeter, area, aspect ratio, density ratio, and perimeter to area ratio of said object;

classifying said object based on the value of at least one of said parameters; and comparing one or more discrete areas having at least one object which has been classified with corresponding discrete areas in said image field of normal level of sensitivity.

7. A method of analyzing an image of a document comprising the steps of:

generating an image field comprising a first set of adjacent pixels having either a black or white character and representing a normal level of sensitivity of said image;

generating an image field of a second set of adjacent pixels having either a black or white character and representing a greater level of sensitivity of said image;

subdividing said image field of said second set of pixels into a plurality of predetermined discrete areas;

scanning a selected one of said discrete areas to identify a black seed pixel;

scanning said one discrete area to identify all black pixels connected to said seed pixel directly or indirectly to identify at least one object in said one discrete area;

determining at least one of the parameters of height, width, perimeter, area, aspect ratio, density ratio, and perimeter to area ratio of said object;

classifying said object based on the value of at least one of said parameters; and comparing at least two adjacent discrete areas of said image field of greater level of sensitivity having at least one object classified as stroke-like with corresponding adjacent discrete areas of said image field of normal level of sensitivity.

8. The method set forth in claim 7 wherein:

the step of comparing comprises counting the number of black pixels in said discrete areas from each of said image fields and comparing the number of black pixels in said discrete areas of the image field of normal sensitivity with the number of black pixels in the corresponding discrete areas of the image field of greater sensitivity.

9. A method of analyzing an image of a document comprising the steps of:

generating an image field comprising a first set of adjacent pixels having either a black or white character and representing a normal level of sensitivity of said image;

generating an image field of a second set of adjacent pixels having either a black or white character and representing a greater level of sensitivity of said image;

subdividing said image field of said second set of pixels into a plurality of predetermined discrete areas;

scanning a selected one of said discrete areas to identify a black seed pixel;

scanning said one discrete area to identify all black pixels connected to said seed pixel directly or indirectly to identify at least one object in said one discrete area;

determining the parameters of perimeter, area, and perimeter to area ratio of said object;

classifying said object based on the value of perimeter to area ratio of said object; and comparing said one discrete area with a corresponding discrete area of said image field of normal level of sensitivity for evaluating the quality of said image field of normal level of sensitivity.

10. The method set forth in claim 9 including the step of:

scanning the pixels of said first set and deleting from said first set a selected grouping of pixels.

11. The method set forth in claim 9 including the step of:

scanning the pixels of said second set and deleting from said second set a selected grouping of pixels.

* * * * *